Oct. 10, 1939.   C. E. MEYERHOEFER   2,175,812
HEATER
Filed April 8, 1939   3 Sheets-Sheet 1
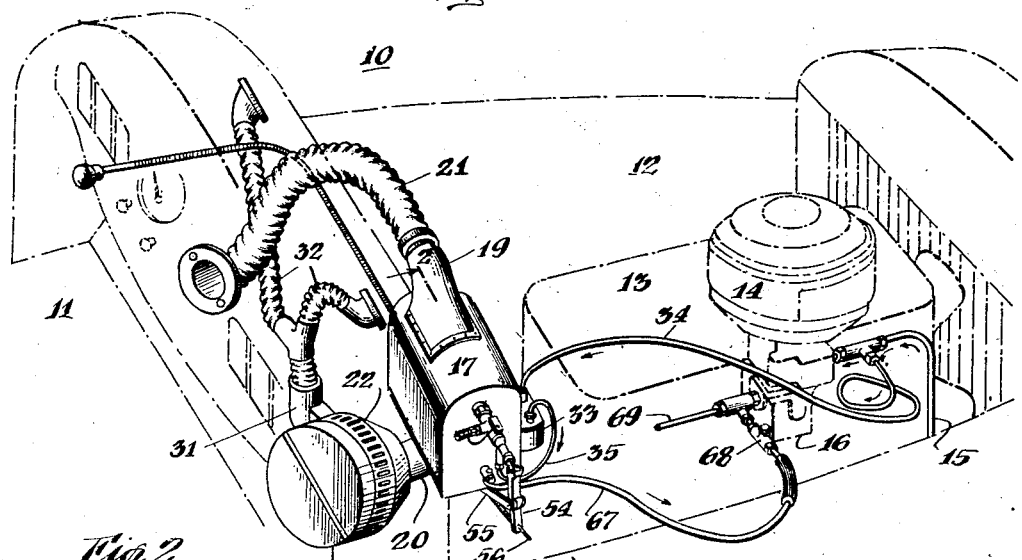
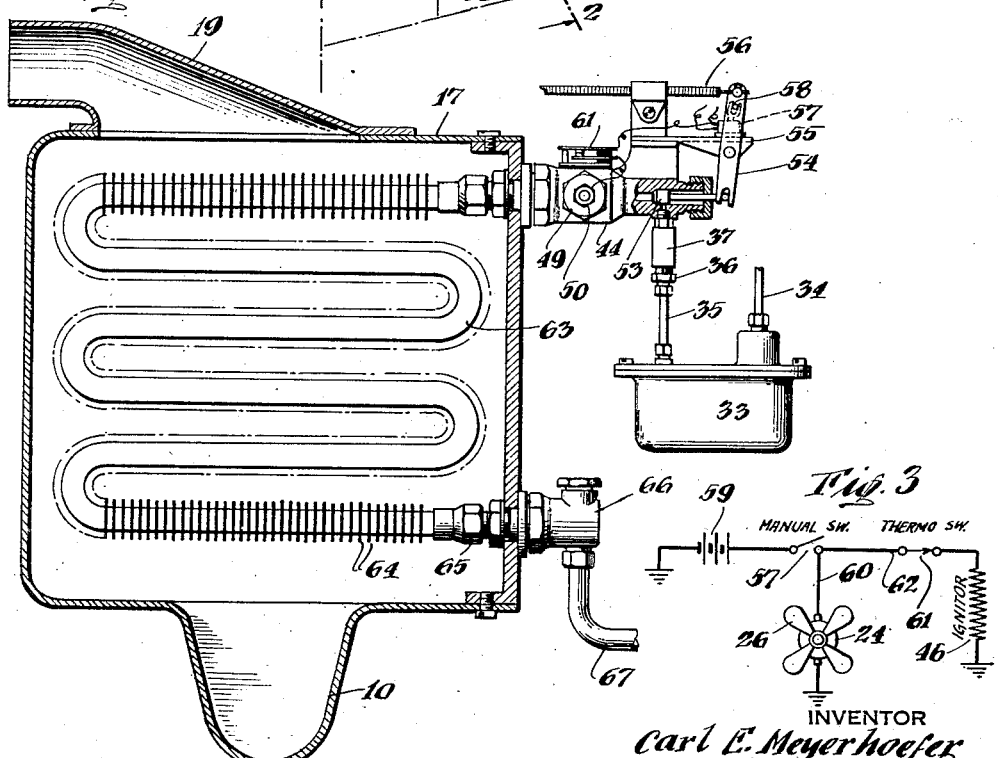
INVENTOR
Carl E. Meyerhoefer
BY Duell, Kann, & Dymont
ATTORNEY Oct. 10, 1939.  C. E. MEYERHOEFER  2,175,812
HEATER
Filed April 8, 1939  3 Sheets-Sheet 2
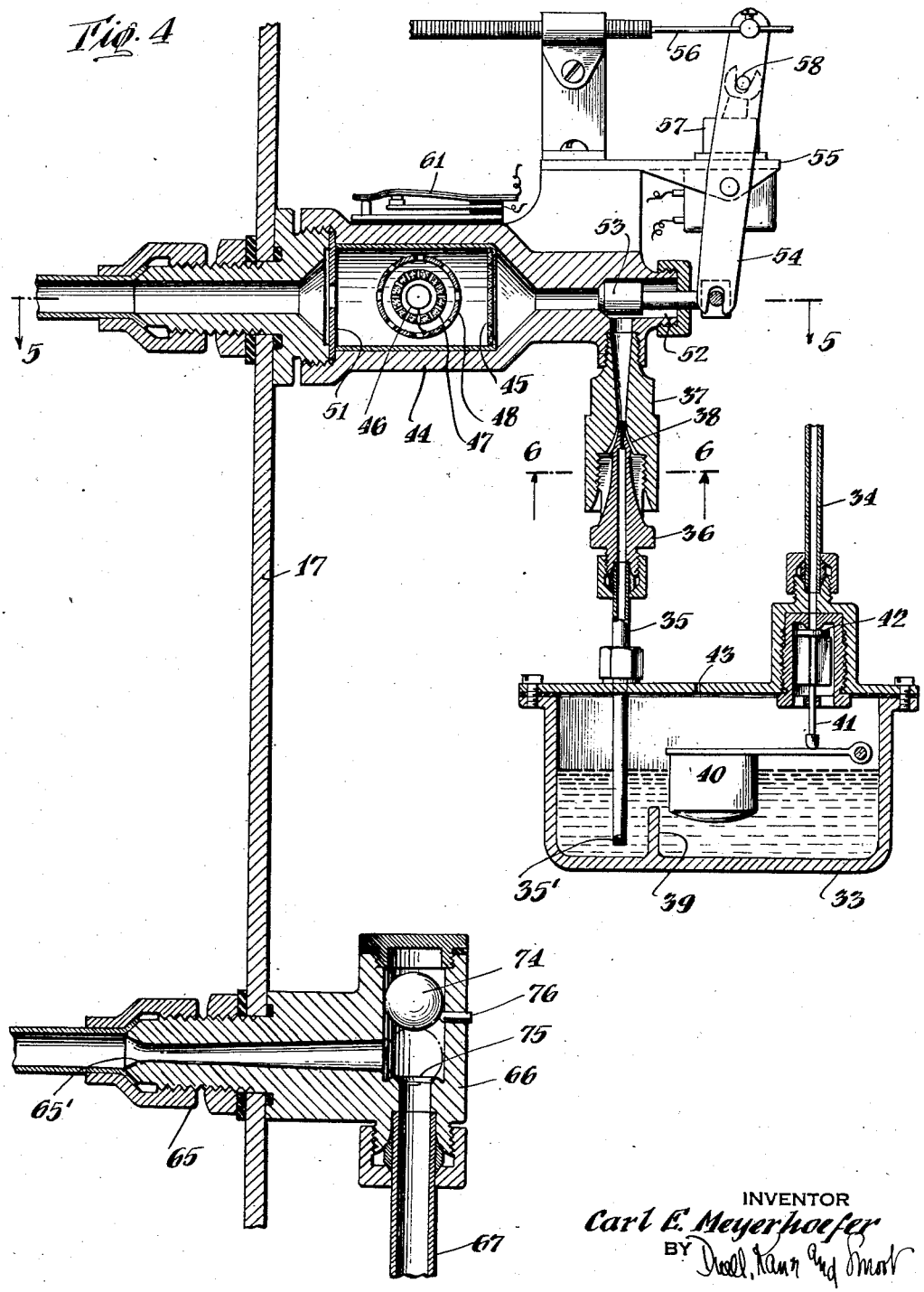
INVENTOR
Carl E. Meyerhoefer
BY
ATTORNEY Oct. 10, 1939.        C. E. MEYERHOEFER        2,175,812
HEATER
Filed April 8, 1939        3 Sheets-Sheet 3
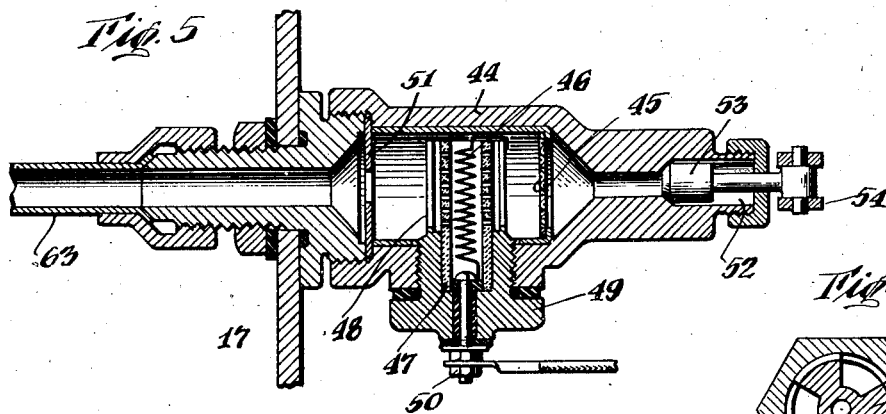
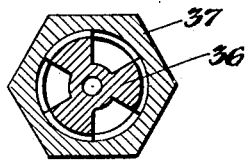
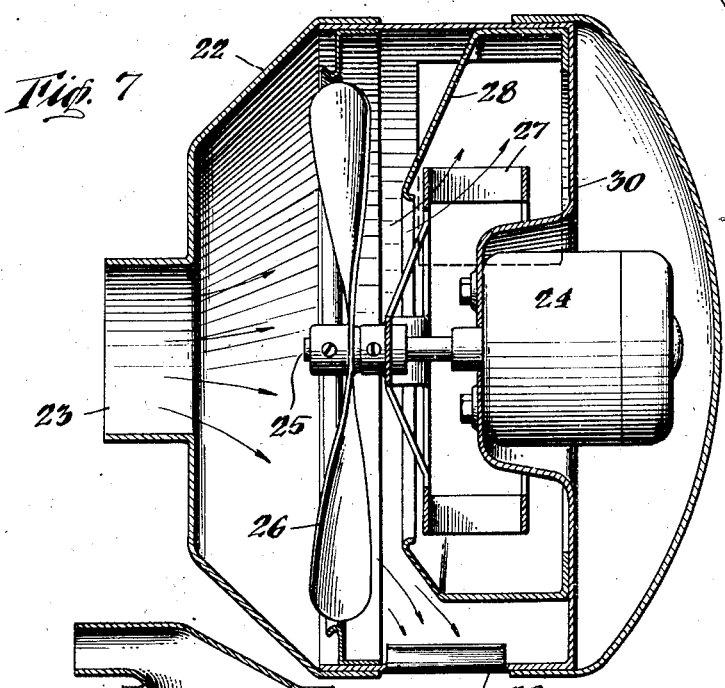
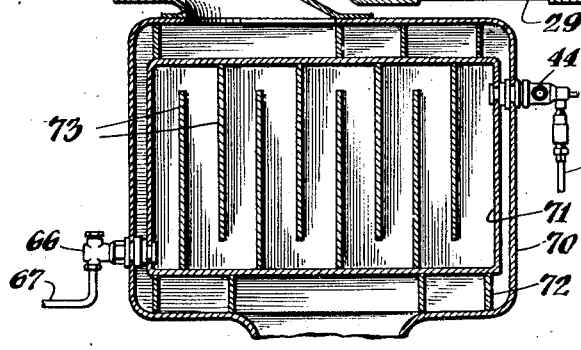
INVENTOR
Carl E. Meyerhoefer
BY
ATTORNEY Patented Oct. 10, 1939

2,175,812

UNITED STATES PATENT OFFICE 2,175,812

HEATER

Carl E. Meyerhoefer, Brooklyn, N. Y., assignor to E. A. Laboratories, Inc., Brooklyn, N. Y., a corporation of New York Application April 8, 1939, Serial No. 266,749

3 Claims. (Cl. 237—12.3)

This invention relates to a structurally and functionally improved heater and especially a heater which will be suitable for use in vehicles and particularly automobiles.

It is an object of the invention to furnish a unit of this character which will be operative to distribute heated air within a very short interval of time after the operator has initiated its functioning. In other words, the usual condition encountered in hot water heaters will not be met where the present invention is adopted, and the occupant of a car will not be under the necessity of permitting the motor to operate anywhere from five to fifteen minutes in order to obtain a proper response on the part of the heater.

A further object of the invention is that of furnishing a heater capable of achieving the foregoing results and in which the operating parts will—when the heater is applied to an automotive vehicle—be segregated from the passenger compartment of the vehicle, so that the passengers may, even under the most unusual circumstances, not be subjected to any danger of injury.

A still further object is that of including a heater structure such that when an unusual but dangerous operating condition is encountered, the heater will be forthwith rendered inoperative in a positive manner so that the dangerous condition may not increase but will, in fact, be neutralized immediately thereafter.

Another object is that of furnishing a heater primarily intended for association with an internal combustion motor and which—when the heater is functioning—will enhance the performance of the motor of such vehicle.

An additional object is that of furnishing a heater and heating system which will embody relatively few parts each individually simple and rugged in construction and capable of production by modern manufacturing methods, such parts being moreover susceptible of ready assemblage and when so assembled, functioning over long periods of time with freedom from all difficulties.

With these and other objects in mind, reference is had to the attached sheets of drawings illustrating practical embodiments of the invention, and in which—

Fig. 1 is a perspective view of the forward portion of a motor vehicle and showing the heater assembly applied thereto;

Fig. 2 is an enlarged sectional view taken along the lines 2—2 and in the direction of the arrows as indicated in Fig. 1;

Fig. 3 shows diagrammatically the circuit which may be included in the unit;

Fig. 4 is an enlarged sectional view of a portion of the heater unit and associated mechanism;

Fig. 5 is a sectional plan view taken along the lines 5—5 and in the direction of the arrows as indicated in Fig. 4;

Fig. 6 is an enlarged transverse sectional view taken along the lines 6—6 and in the direction of the arrows as indicated in Fig. 4;

Fig. 7 is a somewhat diagrammatic sectional view of the air impelling and distributing unit as illustrated in Fig. 1; and Fig. 8 is a sectional plan view of an alternative form of heater.

Referring primarily to Fig. 1, the numeral 10 indicates the body of a motor vehicle, provided with a dash which in the usual manner separates the passenger compartment 11 thereof from the engine compartment 12. Disposed within the latter is the motor 13 provided with a carburetor 14 to which fuel is fed through a line 15 by any suitable mechanism (not shown). This carburetor is connected in the usual manner to an intake manifold 16 through which the fuel mixture is distributed to the cylinders.

According to the present invention, it is preferred that the heater per se be disposed within the engine compartment 12 and with this thought in mind, a casing 17 is mounted in any desirable manner in this position and preferably adjacent the dash. This casing is provided in one of its walls with an outlet opening 18 and in another of its walls with an inlet opening 19. Coupled to these openings are hose or other conduit members 20 and 21 respectively, which pass through openings in the dash. As a consequence, it will be understood that air may be drawn from within the passenger compartment 11 through conduit 21 and casing 17 and then be redischarged into the passenger compartment through conduit 20.

With a view to producing such a flow, one of a number of suitable air impelling units may be employed. Attention is directed in this connection to Fig. 7 wherein the numeral 22 indicates a casing formed with an inlet opening 23 to be coupled to the conduit or hose 20 passing through the dash of the vehicle. The casing may enclose a motor 24 which has a shaft 25 extending from it. Secured to this shaft is a fan 26 and a blower wheel 27. The latter may be enclosed within an encasing portion 28 and as shown, the periphery of casing 22 may be formed with an annular series of openings 29, it being additionally observed that the forward face of the enclosing portion 28 is preferably inclined outwardly toward these openings.

For a purpose hereinafter brought out, the motor 24 may be insulated from contact with the air flowing through casing 22 by providing a partition 30 between the motor and the fan-blower wheel assembly. As illustrated, in Fig. 1, the encasing portion 28 may be provided with an off-set part or housing 31 to which conduits or hose elements 32 may be coupled. The passages thus furnished may extend to points adjacent the windshield and/or any other proper and convenient location within the passenger compartment 11 or its equivalent, so that air may be distributed as desired.

Returning now to a consideration of the heater per se, it will be observed that casing 17 may conveniently mount or have associated with it, a float chamber 33. As illustrated in Fig. 1, this float chamber has extending from it tubes 34 and 35. The first of these tubes is suitably connected to the supply line 15. The second of the same extends to a carburetor assembly of any proper character. This assembly and the construction of the float chamber are best illustrated in Figure 4. As will be seen in this figure, tube 35 may be coupled to a nozzle element 36 which extends into and is coupled against movement with respect to an enclosing element 37. The latter provides a Venturi portion 38 so that if the float chamber 33 contains gasoline and suction is exerted upon the outlet end of element 37, this gasoline together with air, will be drawn through such opening to provide a combustible mixture.

The float chamber 33 may be provided with an interior partition 39 to one side of which the end of tube 35 extends. To the other side of this partition, a float 40 is movably mounted to act upon a stem 41. Adjacent its upper end, the stem may mount a valve 42 which cooperates with a suitable seat to govern the entrance of liquid into the float chamber. It is also to be observed that rod 41 is preferably non-circular in cross-section and cooperates with a guide or guides so that rotation of this element is prevented. At this time it is also to be observed that, for example, the top surface or plate of the float chamber, may be provided with a venting aperture or pin hole 43, for a purpose hereinafter brought out.

Connected to the carburetor is a combustion chamber generally defined by a housing 44. At its entrance end this housing may be provided with a wire mesh partition, or other suitable perforate member 45.

As shown especially in Figure 5, a combustion initiating and maintaining unit extends into this chamber. This unit preferably includes a coil 46 of wire. Enclosing this coil is a tube 47 preferably formed of ceramic material, and which has a series of perforations. Concentrically disposed with reference to tube 47 and spaced therefrom is a further tube 48 which may be provided with a series of longitudinally extending slots. Tube 48 may conveniently be formed of stainless steel and be integral with or mounted upon a bushing 49 threaded into a correspondingly threaded opening in the wall of housing 44. This bushing may also mount the tube 47 and coil 46. One end of the latter may be grounded against tube 48, but its opposite end is insulated from bushing 49 and is continued in the form of a terminal 50 extending beyond the latter.

It is thus obvious that if a combustible mixture is drawn through housing 44, this mixture will be ignited if coil 46 is energized, and if combustion is continued for a certain interval, tube 47 will become substantially incandescent so that combustion will be maintained by this unit. Thus, with a continuing flow of fluid (combustible mixture and products of combustion) gases at high temperature will be discharged from housing 44, their escape being preferably through the central aperture of a plate or ring 51 defining the end of the combustion chamber.

As shown to best advantage in Figures 4 and 5, this entire assembly is mounted upon the wall of casing 17. With a view to controlling the flow of mixture and gases as afore-referred to, it is preferred, as particularly shown in Figure 4, that the entrance end of housing 44, or a continuation thereof, provide a valve chamber 52 including a seat against which a valve 53 may bear to interrupt any flow from the carburetor to the combustion chamber. This valve may be shifted by having its stem connected to a lever 54 rockingly mounted upon a bracket 55 coupled to housing 44. The opposite end of the lever may be secured to a control 56, and a switch 57 may also be coupled to the lever by, for example, a pin 58. Accordingly, when control 56 is actuated, it will cause switch 57 to be operated and will also shift valve 53. The switch is so related to the lever that simultaneously with the unseating of valve 53, the switch is closed and when such valve is closed, the switch is opened.

As shown especially in Fig. 3, a source of electrical energy 59, such as the battery of a car, may have one of its terminals grounded. The other of the same is coupled to switch 57. This switch has extending from it a lead 60 which couples to motor 24, the opposite side of the latter being conveniently grounded. A thermostatic switch 61 is mounted upon housing 44 and, when cold, has its contacts in engagement. When heated, this switch has its contacts separated. One side of this latter switch is coupled by a lead 62 to switch 57. The other side of switch 61 is coupled to coil 46. With the foregoing in mind, it will be apparent that when control 56 is actuated, switch 57 will be closed. With this switch closed, motor 24 will operate and coil 46 will be energized. Also incident to operation of control 56, valve 53 will be unseated and thus if suction exists at the outlet end of chamber 44, a gaseous mixture will flow through the combustion chamber and be ignited. After the combustion has continued for a certain length of time, it will no longer be necessary to continue the energization of coil 46, and accordingly switch 61 will be opened so that the load upon the battery or other source of electrical energy will be diminished. Thereafter, if for any reason combustion should not be maintained by the tube 47, it will be apparent that switch 61 would cool to a point such that it will again close and initiate combustion. The purpose of the vent opening 43 will now also be apparent in that when valve 53 is opened, there will at all times be a venting action so that no "lock" may occur.

Now, referring to the construction within casing 17, attention is directed primarily to Figure 2 in which a preferred unit has been shown. This may include simply a tube 63, formed of any suitable metal, and arranged to include convolutions, spirals, zig-zag, or other formation. This tube preferably has secured to or formed integral with it, a series of heat radiating fins 64 and the tube is coupled at its inlet end to the outlet of chamber 44, while its opposite end is coupled by a similar fitting 65, to a unit 66 from which a tube 67 extends to the intake manifold. It is thus apparent that a very efficient form of heat exchange structure is furnished within casing 17, and accordingly with air flowing through the same from opening 19 to opening 18, this air will be highly heated and discharged—at the will of the operator—in any desired location within the interior of the vehicle.

Moreover, it will be observed that due to the connection provided by pipes 34, 35, and 67, a source of suction is furnished such that a flow may occur through these elements, as well as the parts of the heater assembly. Realizing that under variable operating conditions of the motor 13, varying conditions of vacuum occur, I may provide a valve 68 at a point for example, between the end of pipe 67 and the intake manifold. This valve may, for example, be set so that at no time will the condition of vacuum within pipe 67 exceed five inches. Accordingly, the apparatus will not be subject to widely fluctuating conditions of vacuum over the entire range as existing within the intake manifold of the motor. Moreover, within the extension of unit 66 a constriction 65' may be provided and which will function to prevent pulsations being transmitted to the combustion chamber, thus, evening out the flow. Additionally at its intake end, pipe 35 may mount a metering plug 35', the orifice of which should be of very small diameter. Before departing from consideration of this particular portion of the construction, it is to be noted that the pipe 67 and valve 68 may, instead of being directly coupled to intake manifold 16, be coupled to the windshield wiper line 69.

In certain instances it might be desired to employ a heat exchange structure of slightly different construction from that shown in Figure 2. Such a structure might obviously be furnished by employing an exterior casing 70 within which an interior casing 71 is disposed. These casings would be arranged in spaced relation and any desired number of heat radiating fins 72 might be interposed between them. The combustion housing 44 would be coupled to the interior of casing 71 at, for example, one end of the same, and the unit 66 and pipe 67 would be conveniently coupled to the opposite end of the same. Within casing 70 a plurality of partitions 73 should be disposed and extending from opposite side walls of the same. Each of these partitions should be shorter than the width of casing 71 and adjacent partitions should be arranged in staggered relationship. Accordingly, the products of combustion in their flow through chamber 71 would follow a tortuous path. Of course, the air would be blown in contact with casing 71 and over fins 72 so that a maximum heat transfer function would occur.

Finally, it will be understood that under certain circumstances, motor 24 might fail or otherwise air might be prevented from flowing in heat exchange contact over casing 71 or tube 63. In such event, a dangerously high temperature might be encountered. In order to avoid such a condition, unit 66 is provided. This unit may house a valve, for example, in the form of a ball 74 which, as shown, and under the influence of gravity, tends to drop upon a seat 75 formed in unit 66. Under such circumstances, a further flow of gases through tube 67 would be prevented. Accordingly, suction through the combustion chamber 44 would be interrupted and no combustible mixture would be introduced into the same. Thus, the combustion would be interrupted. In order to prevent such a result, valve 74 may normally be maintained in inoperative position by, for example, a fusible plug 76. However, should the temperature of the gases exhausting through pipe 67 reach a sufficiently high point, plug 76 will fuse and the desired results will be achieved so that no damage will occur.

From the foregoing it is believed that to those skilled in the art, the operation and advantages of the present mechanism will be apparent. However, to briefly review the operation, it will be understood that if the heater and system are constructed along the lines heretofore suggested, and are installed in an automotive vehicle, the heater will be wholly isolated within the engine compartment, and only the warm air will be distributed within the passenger compartment. A mechanic in installing the heater will not have to disorganize the mechanism of the automobile, but will simply be subjected to the necessity of providing a pair of openings through the dash and mounting apparatus upon the opposite faces of this partition. Of course, it will be understood that any other desired form of mounting might be resorted to and likewise, a heater might be disposed in association with mechanism other than an automobile. However, in view of the fact that the heater is primarily designed for such an installation, this has been illustrated in the present embodiments.

Thus, no problem will be involved in interposing the fitting at the end of line 34 between the feed pipe 15 and the carburetor 14. Also, no disorganization of the apparatus will occur incident to connecting the line or tube 67 and valve 68 to the intake manifold. With such connection established, there is a tendency for fluid to flow through pipe 34, the heater, and to return through pipe 67. If such flow is not interrupted and the heater is operating, the heated products of combustion will, of course, intermingle with the incoming fuel charge flowing through intake manifold 16, and to consequently preheat and dry the mixture as it flows toward the cylinders. This will contribute to the efficient operation of the motor.

In the event control 56 is inoperative, such flow will, of course, not occur, but as soon as the control is operated, the igniting element will be energized and a combustible mixture will be provided by the carburetor assembly associated with the float tank 33. Thereupon part of the products of combustion will flow through the heat exchange structure. Simultaneously with the actuation of the control 56—and according to the preferred embodiment of the invention—the fan motor 24 will cause air to flow in heat exchange relationship with the heat transfer surfaces disposed within casing 17. This action will be almost instantaneous because the heat exchange structure will become warm in a matter of seconds and consequently air flowing over the proper surfaces will become hot.

The heating of the apparatus will be reflected in a functioning of the thermostatic switch 61 so that this switch opens. By that time, the combustion initiating apparatus will have reached a condition such that combustion will be maintained and accordingly the load imposed upon the battery may be reduced without fear that the combustion will be interrupted. Nevertheless, if for some unforseen reason, combustion should be interrupted (as, for example, in installations where the suction within line 67 would drop to such a low point that no flow would occur) the thermostatic switch 61 will respond by closing, and accordingly, the apparatus will continue to function immediately upon suction being reestablished.

It should be borne in mind that by means of the valve 74 or its equivalent, and in the event of the temperature of the apparatus reaching a dangerous point, the flow will be interrupted and combustion will cease. This will occur well before any critical temperature is reached, and such as might cause danger to the parts. Under these circumstances, switch 61 would, of course, again close, but an operator would become cognizant of the fact that the heater was not operating and would accordingly throw control 56 to the "off" position. Thereafter, he or a service station could readily readjust, repair, or replace the air impelling structure as shown in Figure 7—or its operative equivalent—and could also replace the pin 76, which, of course, would be done after the valve had been readjusted to its potentialized position. Thus, a safety factor is incorporated which may well remain inoperative for months and years, but which nevertheless would function instantly upon a dangerous operating condition being encountered.

In conclustion, it will be understood that as a consequence of providing the valve 53 at a point between the combustion chamber and carburetor that—with this valve seated—all flow of fluid through the combustion chamber, the heat exchange unit and the tube connecting the same to the intake manifold, is stopped. Thus even if the parts are at low temperature, it will be found, that as the apparatus is caused to function by opening the valve, combustion is readily imparted. This is due to the fact that the vacuum created by the motor will, under the circumstances, extend through the heat exchange element and combustion chamber. As is well known, the fuel mixture will ignite at far lower temperatures under a condition of vacuum than would otherwise be the case, and thus the desired result is achieved. It will also be observed that the switch 57 is of the "snap" type which embodies a spring, tending to maintain the switch in either open or closed position. As a consequence of being coupled to the same control, which actuates the valve 53, it is apparent that the switch itself will bias the latter to either open or closed positions.

From the foregoing it will be obvious that among others the several objects of the invention as specifically afore noted are achieved. Obviously numerous changes in construction and rearrangement of the parts might be resorted to without departing from the spirit of the invention as defined by the claims.

Having described my invention, what I claim as new and desire to secure by Letters Patent is:

1. A heating apparatus for application to a motor vehicle and including in combination, a tube to be connected to the fuel supply pipe of the automobile, a further tube to be connected to the intake manifold of the automobile engine, a carburetor connected to said first named tube, means providing a combustion chamber coupled to said carburetor, a heat exchange element providing a passage between said combustion chamber and said further tube, a casing formed with inlet and outlet openings and enclosing said element, means for igniting fuel within said combustion chamber, a valve for preventing all flow through said further tube and heat exchange element, said valve being interposed between said combustion chamber and carburetor, whereby the vacuum created by the motor and transmitted through the further tube will—with the valve closed—extend through the combustion chamber to thereby assist in the ready ignition of the combustible mixture within the same as said valve is opened, a snap type switch coupled to said igniting means for energizing and deenergizing the same, valve actuating means coupled to said switch whereby the latter acts to bias said valve to opened and closed positions, and means for causing a circulation of fluid to be heated through said casing and from the inlet to the outlet openings thereof.

2. A heating apparatus for application to a motor vehicle and including in combination, a tube to be connected to the fuel supply pipe of the automobile, a further tube to be connected to the intake manifold of the automobile engine, a carburetor connected to said first named tube, means providing a combustion chamber coupled to said carburetor, an additional tube forming a heat exchange element and extending downwardly from and connected to said chamber, a casing enclosing said additional tube and formed with inlet and outlet openings, means for igniting fuel within said combustion chamber, said additional tube being arranged out of contact with said casing and unsupported between the inlet and outlet openings thereof, a valve for preventing all flow through said further tube and heat exchange element, said valve being interposed between said combustion chamber and carburetor, whereby the vacuum created by the motor and transmitted through the additional tube will —with the valve closed—extend through the combustion chamber to thereby assist in the ready ignition of the combustible mixture within the same as said valve is opened, means for causing a flow of fluid to be heated through said casing and from the inlet to the outlet opening of the same, a further valve positioned between the outlet side of said combustion chamber and said further tube and adapted, when in seated position, to also interrupt all flow of fluid through said combustion chamber, heat exchange element and further tube and means normally maintaining said further valve in inoperative position, said last-named means functioning in the event of the temperature of the heat exchange element exceeding a predetermined degree to permit said further valve to close.

3. A heating apparatus including a pair of tubes to be connected respectively to the fuel supply pipe and intake manifold of an internal motor, a carburetor connected to one of said tubes, a combustion chamber connected to said carburetor, a heat exchange tube coupled to said combustion chamber, a casing enclosing said latter tube and formed with inlet and outlet openings through which fluid is to flow, and a valve assembly connecting said last named tube to the second of said pair of tubes, said assembly including a further casing, a valve within said casing and when seated interrupting the flow of fluid through said tubes, fusible means normally preventing said valve from seating until a predetermined temperature has been exceeded, and said valve and valve operating means being completely enclosed within said further casing whereby said valve and operating means are inaccessible from the exterior of said casing.

CARL E. MEYFRHOEFER.